US011747597B2

(12) United States Patent
Ko et al.

(10) Patent No.: US 11,747,597 B2
(45) Date of Patent: Sep. 5, 2023

(54) TELESCOPIC OPTICAL IMAGING SYSTEM

(71) Applicant: Samsung Electro-Mechanics Co., Ltd., Suwon-si (KR)

(72) Inventors: Jung Hui Ko, Suwon-si (KR); Ju Hwa Son, Suwon-si (KR); Ju Sung Park, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/511,653

(22) Filed: Oct. 27, 2021

(65) Prior Publication Data

US 2022/0050275 A1   Feb. 17, 2022

Related U.S. Application Data

(63) Continuation of application No. 16/045,866, filed on Jul. 26, 2018, now Pat. No. 11,187,875.

(30) Foreign Application Priority Data

Dec. 4, 2017   (KR) .................. 10-2017-0164905

(51) Int. Cl.
  *G02B 9/62* (2006.01)
  *G02B 13/00* (2006.01)
  *G02B 13/02* (2006.01)
(52) U.S. Cl.
  CPC .......... *G02B 13/0045* (2013.01); *G02B 9/62* (2013.01); *G02B 13/02* (2013.01)

(58) Field of Classification Search
  CPC ....... G02B 13/0045; G02B 13/02; G02B 9/62
  See application file for complete search history.

(56) References Cited

U.S. PATENT DOCUMENTS

| 9,588,318 | B2 | 3/2017 | Chen et al. |
| 9,733,453 | B2 | 8/2017 | Tsai et al. |
| 9,835,825 | B2 | 12/2017 | Kubota et al. |
| 2015/0370042 | A1 | 12/2015 | Chen et al. |
| 2016/0109688 | A1 | 4/2016 | Jo |

(Continued)

FOREIGN PATENT DOCUMENTS

| CN | 105319679 A | 2/2016 |
| CN | 205333956 U | 6/2016 |

(Continued)

OTHER PUBLICATIONS

Chinese Office Action dated Dec. 23, 2021, in counterpart Chinese Patent Application No. 201811359247.7 (11 pages in English and 11 pages in Chinese).

(Continued)

*Primary Examiner* — Joseph P Martinez
(74) *Attorney, Agent, or Firm* — NSIP Law

(57) ABSTRACT

An optical imaging system includes a first lens which has refractive power, a second lens which has refractive power, a third lens which has a convex object-side surface, and an inflection point is formed on an image-side surface thereof, a fourth lens which has refractive power, a fifth lens which has a convex object-side surface, and a sixth lens which has refractive power and an inflection point is formed on an image-side surface thereof, and wherein the first to sixth lens are sequentially disposed from an object side.

16 Claims, 6 Drawing Sheets

(56) References Cited

U.S. PATENT DOCUMENTS

| | | | |
|---|---|---|---|
| 2016/0131870 A1 | 5/2016 | Tang et al. | |
| 2016/0313536 A1 | 10/2016 | Kubota et al. | |
| 2016/0356989 A1 | 12/2016 | Kubota et al. | |
| 2017/0059828 A1 | 3/2017 | Sekine et al. | |
| 2017/0090156 A1 | 3/2017 | Hsu et al. | |
| 2017/0102522 A1 | 4/2017 | Jo | |
| 2017/0108666 A1 | 4/2017 | Lee | |
| 2017/0146776 A1 | 5/2017 | Kang et al. | |
| 2017/0153420 A1 | 6/2017 | Park | |
| 2017/0219802 A1 | 8/2017 | Chen et al. | |
| 2017/0219803 A1 | 8/2017 | Lee et al. | |
| 2017/0235102 A1 | 8/2017 | Lai et al. | |
| 2017/0248770 A1 | 8/2017 | Chen et al. | |
| 2017/0307850 A1* | 10/2017 | Jhang | G02B 9/62 |
| 2017/0371130 A1 | 12/2017 | Huang et al. | |

FOREIGN PATENT DOCUMENTS

| | | |
|---|---|---|
| CN | 106569322 A | 4/2017 |
| CN | 106597636 A | 4/2017 |
| CN | 106802464 A | 6/2017 |
| JP | 2014-109764 A | 6/2014 |
| JP | 2016-206392 A | 12/2016 |
| JP | 2017-3703 A | 1/2017 |
| JP | 2017-049329 A | 3/2017 |
| KR | 10-2017-0090172 A | 8/2017 |
| KR | 10-2017-0108669 A | 9/2017 |
| WO | WO 2017/041456 A1 | 3/2017 |

OTHER PUBLICATIONS

Korean Office Action dated May 10, 2022, in counterpart Korean Patent Application No. 10-2022-0025211 (7 pages in English and 5 pages in Korean).
Korean Office Action dated Jun. 11, 2019 in corresponding Korean Patent Application No. 10-2017-0164905 (9 pages in English, 5 pages in Korean).
Korean Office Action dated Dec. 6, 2018 in corresponding Korean Patent Application No. 10-2017-0164905 (10 pages in English, 5 pages in Korean).
Chinese Office Action dated Oct. 9, 2020 in counterpart Chinese Patent Application No. 201811359247.7 (4 pages in English, 5 pages in Chinese).
Korean Office Action dated Nov. 23, 2020 in counterpart Korean Patent Application No. 10-2020-0003753 (6 pages in English, 4 pages in Korean).
Korean Office Action dated Feb. 4, 2021 in counterpart Korean Patent Application No. 10-2020-0003753 (6 page in English, 4 pages in Korean).
Notice of Decision for Rejection dated May 10, 2021 in counterpart Korean Patent Application No. 10-2020-0003753 (3 pages in English, 3 pages in Korean).
Notice of Dismissal for Amendment dated May 10, 2021 in counterpart Korean Patent Application No. 10-2020-0003753 (5 pages in English, 3 pages in Korean).
Chinese Office Action dated Jun. 4, 2021 in counterpart Chinese Patent Application No. 201811359247.7 (4 pages in English, 5 pages in Chinese).
Korean Dismissal for Amendment dated Jul. 9, 2021 in counterpart Korean Patent Application No. 10-2020-0003753 (5 pages in English and 3 pages in Korean).
Korean Decision of Rejection and the Dismissal for Amendment from the KIPO dated Jul. 9, 2021 in counterpart Korean Patent Application No. 10-2020-0003753 (3 pages in English and 3 pages in Korean).

* cited by examiner

TELESCOPIC OPTICAL IMAGING SYSTEM

CROSS-REFERENCE TO RELATED APPLICATION(S)

This application is a Continuation Application of U.S. patent application Ser. No. 16/045,866, filed on Jul. 26, 2018, which claims the benefit under 35 USC 119(a) of Korean Patent Application No. 10-2017-0164905 filed on Dec. 4, 2017 in the Korean Intellectual Property Office, the entire disclosure of which is incorporated herein by reference for all purposes.

BACKGROUND

1. Field

The present disclosure relates to a telescopic optical imaging system including six lenses.

2. Description of Related Art

Small camera components may be mounted in mobile communication terminals. For example, the small camera components may be mounted in devices that have a thin form factor, such as mobile phones, or similar devices. The small camera components may include an optical imaging system including a small number of lenses that allow the devices to maintain their thin form factor. For example, the optical imaging system of the small camera component may include four or less lenses. However, such an optical imaging system may have a high f-number or focal ratio, such that it may be difficult for the optical imaging system to be used in a small camera module that has a high performance.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens which has refractive power, a second lens which has refractive power, a third lens which has a convex object-side surface, and an inflection point is formed on an image-side surface thereof, a fourth lens which has refractive power, a fifth lens which has a convex object-side surface; and a sixth lens which has refractive power, and an inflection point is formed on an image-side surface thereof, wherein the first to sixth lenses are sequentially disposed from an object side.

An inflection point may be formed on an image-side surface of the first lens.

A sign of refractive power of the second lens may be different from a sign of the refractive power of the first lens.

The image-side surface of the third lens may be concave.

The fourth lens may have negative refractive power.

The fifth lens may have negative refractive power.

An image-side surface of the fifth lens may be concave.

The sixth lens may have positive refractive power.

The image-side surface of the sixth lens may be concave.

The optical imaging system may include a stop disposed between the first lens and the second lens.

In a general aspect, an optical imaging system includes a first lens which has refractive power and which has an inflection point formed on an image-side surface thereof, a second lens which has refractive power, a third lens which has refractive power, a fourth lens which has refractive power, a fifth lens of which an object-side surface is convex; and a sixth lens which has refractive power and which has an inflection point formed on an image-side surface thereof, wherein the first to sixth lenses are sequentially disposed from an object side.

An inflection point may be formed on an image-side surface of the third lens.

An f-number of the optical imaging system may be 2.0 or less.

An entire field of view (FOV) of the optical imaging system may be 80° or more.

In the optical imaging system, TTL/f<1.2 in which TTL is a distance from an object-side surface of the first lens to an imaging plane, and f is an overall focal length of the optical imaging system.

In the optical imaging system, f1/f<1.0 in which f is an overall focal length of the optical imaging system, and f1 is a focal length of the first lens.

In a general aspect, an optical imaging system includes a first lens which has a positive refractive power and a convex object-side surface, a second lens which has a negative refractive power and a convex object-side surface, a third lens which has a positive refractive power, a convex object-side surface, and an inflection point formed on an image-side surface, a fourth lens which has a negative refractive power and a concave image-side surface, a fifth lens which has a negative refractive power, and a sixth lens which has a positive refractive power and a concave image-side surface, wherein the first to sixth lenses are sequentially disposed from an object side.

The first lens may have a concave image-side surface.

Inflection points may be formed on the image-side surface of the first lens.

The fifth lens and/or the sixth lens may have inflection points on the image-side surface and the object-side surface.

Other features and aspects will be apparent from the following detailed description, the drawings, and the claims.

BRIEF DESCRIPTION OF THE DRAWINGS

The above and other aspects, features, and advantages of the present disclosure will be more clearly understood from the following detailed description taken in conjunction with the accompanying drawings, in which.

Figure 1:
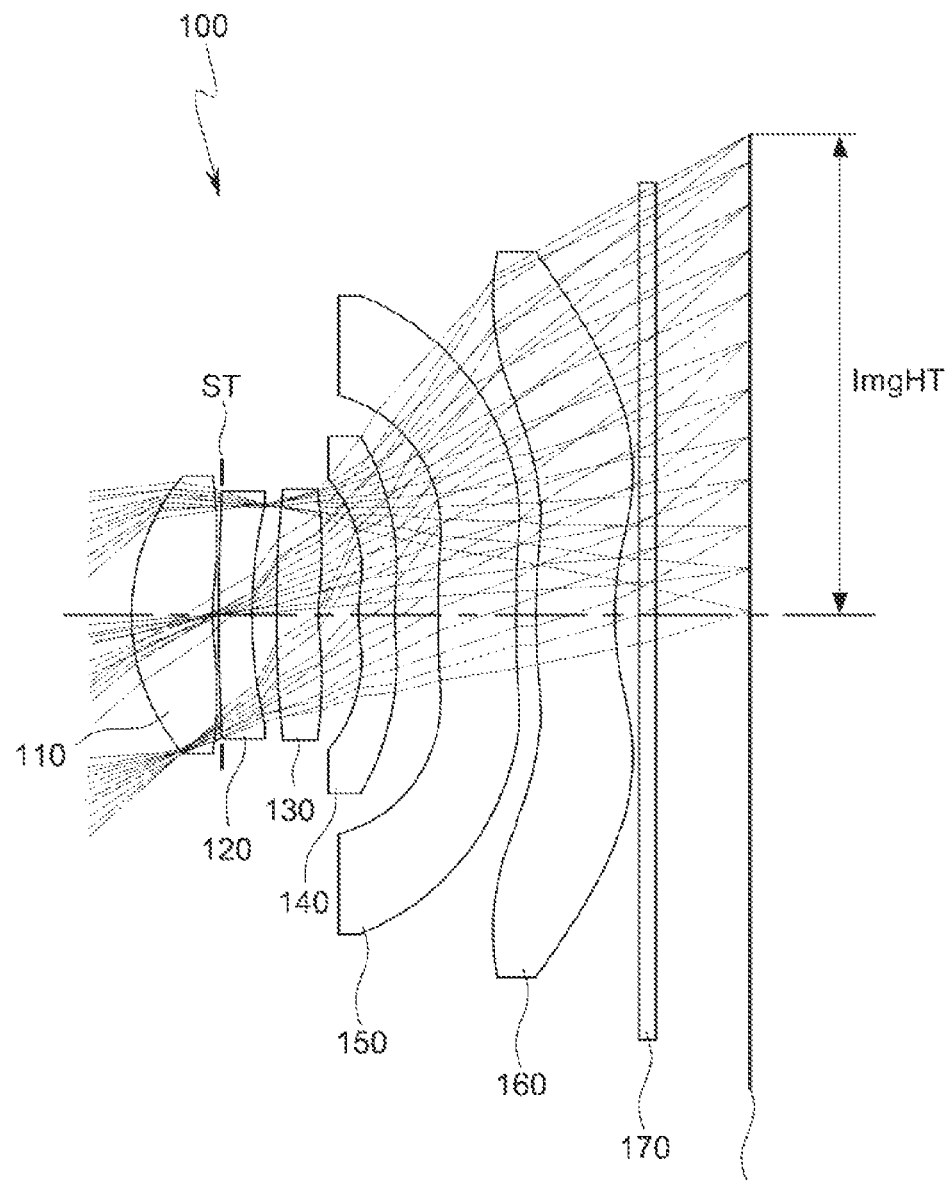
FIG. 1 is a view illustrating a first example of an optical imaging system.

Throughout the drawings and the detailed description, the same reference numerals refer to the same elements. The drawings may not be to scale, and the relative size, proportions, and depiction of elements in the drawings may be exaggerated for clarity, illustration, and convenience. In the drawings, for example, due to manufacturing techniques and/or tolerances, modifications of the shape shown may be estimated. Thus, the examples described herein should not be construed as being limited to the particular shapes of regions shown herein, for example, the examples described herein include a change in shape as a result of manufacturing.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

In addition, in the various examples, a first lens may refer to a lens closest to an object (or a subject) being imaged, while a sixth lens may refer to a lens closest to an imaging plane (or an image sensor). In addition, all of radii of curvature and thicknesses of lenses, a through-the-lens (TTL) metering, an IMG HT (a half of a diagonal length of the imaging plane), and focal lengths of the lenses may be represented by millimeters (mm). Further, thicknesses of the lenses, gaps between the lenses, and the TTL metering may be distances calculated on the basis of optical axes of the lenses. When describing the shapes of the lenses, a notation that one surface of a lens is convex means that an optical axis portion of a corresponding surface is convex, and a notation that one surface of a lens is concave means that an optical axis portion of a corresponding surface is concave. Therefore, although the description may note that one surface of a lens is convex, an edge portion of the same lens may be concave. Similarly, although a description may note that one surface of a lens is concave, an edge portion of the same lens may be convex.

An optical imaging system may include six lenses. For example, the optical imaging system may include a first lens, a second lens, a third lens, a fourth lens, a fifth lens, and a sixth lens that are sequentially disposed from an object side. The first to sixth lenses may be disposed with an air interval between each of the lenses. For example, an image-side surface of one of neighboring lenses and an object-side surface of the other lens may not be in contact with each other.

In an example, the first lens may have refractive power. For example, the first lens may have positive refractive power. One surface of the first lens may be convex. For example, an object-side surface of the first lens may be convex. Inflection points may be formed on the first lens. For example, one or more inflection points may be formed on an image-side surface of the first lens.

In an example, the first lens may have an aspherical surface. For example, both surfaces of the first lens may be aspherical. The first lens may be formed of a material having high light transmissivity and excellent workability. For example, the first lens may be formed of plastic. However, a material of the first lens is not limited to the plastic. For example, the first lens may be formed of glass. The first lens may have a small refractive index. For example, the refractive index of the first lens may be less than 1.6, but is not limited thereto.

In an example, the second lens may have refractive power. For example, the second lens may have negative refractive power. One surface of the second lens may be convex. For example, an object-side surface of the second lens may be convex.

In an example, the second lens may have an aspherical surface. For example, an object-side surface of the second lens may be aspherical. The second lens may be formed of a material having high light transmissivity and excellent workability. For example, the second lens may be formed of plastic. However, a material of the second lens is not limited to the plastic. For example, the second lens may also be formed of glass. The second lens may have a refractive index greater than that of the first lens. For example, the refractive index of the second lens may be 1.65 or more, but is not limited thereto.

In an example, the third lens may have refractive power. For example, the third lens may have positive refractive power. One surface of the third lens may be convex. For example, an object-side surface of the third lens may be convex. Inflection points may be formed on the third lens. For example, one or more inflection points may be formed on an image-side surface of the third lens.

In an example, the third lens may have an aspherical surface. For example, both surfaces of the third lens may be aspherical. The third lens may be formed of a material having high light transmissivity and excellent workability. For example, the third lens may be formed of plastic. However, a material of the third lens is not limited to the plastic. For example, the third lens may be formed of glass. The third lens may have a refractive index smaller than that of the second lens. For example, the refractive index of the third lens may be less than 1.6, but is not limited thereto.

In an example, the fourth lens may have refractive power. For example, the fourth lens may have negative refractive power. One surface of the fourth lens may be concave. For example, an image-side surface of the fourth lens may be concave.

In an example, the fourth lens may have an aspherical surface. For example, an object-side surface of the fourth lens may be spherical, and an image-side surface thereof may be aspherical. The fourth lens may be formed of a material having high light transmissivity and excellent workability. For example, the fourth lens may be formed of plastic. However, a material of the fourth lens is not limited to the plastic. For example, the fourth lens may be formed of glass. The fourth lens may have a refractive index greater than that of the third lens. For example, the refractive index of the fourth lens may be 1.6 or more, but is not limited thereto.

In an example, the fifth lens may have refractive power. For example, the fifth lens may have negative refractive power. One surface of the fifth lens may be convex. For example, an object-side surface of the fifth lens may be convex. The fifth lens may have an inflection point. For example, an inflection point may be formed on at least one of the object-side surface and an image-side surface of the fifth lens.

In an example, the fifth lens may have an aspherical surface. For example, both surfaces of the fifth lens may be aspherical. The fifth lens may be formed of a material having high light transmissivity and excellent workability. For example, the fifth lens may be formed of plastic. However, a material of the fifth lens is not limited to the plastic. For example, the fifth lens may be formed of glass. The fifth lens may have a refractive index that is substantially similar to that of the fourth lens. For example, the refractive index of the fifth lens may be 1.6 or more, but is not limited thereto.

In an example, the sixth lens may have refractive power. For example, the sixth lens may have positive refractive power. One surface of the sixth lens may be concave. For example, an image-side surface of the sixth lens may be concave. The sixth lens may have an inflection point. For example, an inflection point may be formed on at least one of an object-side surface and an image-side surface of the sixth lens.

In an example, the sixth lens may have an aspherical surface. For example, both surfaces of the sixth lens may be aspherical. The sixth lens may be formed of a material having high light transmissivity and excellent workability. For example, the sixth lens may be formed of plastic. However, a material of the sixth lens is not limited to the plastic. For example, the sixth lens may be formed of glass. The sixth lens may have a refractive index greater than that of the fifth lens. For example, the refractive index of the sixth lens may be less than 1.6, but is not limited thereto.

The aspherical surfaces of the first to sixth lenses may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \qquad \text{Equation 1}$$

Here, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

The optical imaging system may further include a filter, an image sensor, and a stop.

The filter may be disposed between the sixth lens and the image sensor. The filter may block some wavelengths of light. For example, the filter may block an infrared wavelength of light.

The image sensor may form the imaging plane. For example, a surface of the image sensor may form the imaging plane.

The stop may be disposed in order to control an amount of light incident to the lenses. For example, the stop may be disposed between the first and second lenses.

The optical imaging system may satisfy the following Conditional Expressions:

| | |
|---|---|
| $F\text{ No.} < 2.0$ | Conditional Expression 1 |
| $80 < FOV$ | Conditional Expression 2 |
| $TTL/f < 1.2$ | Conditional Expression 3 |
| $f1/f < 1.0$ | Conditional Expression 4 |
| $4.0 < D34/D12$ | Conditional Expression 5 |
| $1.0 < D34/D23$ | Conditional Expression 6 |
| $0.8 < D34/D45 < 1.0$ | Conditional Expression 7 |
| $6.0 < |R7/R8|$ | Conditional Expression 8 |
| $20 < f6/f1.$ | Conditional Expression 9 |

Here, TTL is a distance from the object-side surface of the first lens to the imaging plane, f is an overall focal length of the optical imaging system, D12 is a distance from the image-side surface of the first lens to the object-side surface of the second lens, D23 is a distance from an image-side surface of the second lens to the object-side surface of the third lens, D34 is a distance from the image-side surface of the third lens to the object-side surface of the fourth lens, D45 is distance from the image-side surface of the fourth lens to the object-side surface of the fifth lens, R7 is a radius of curvature of the object-side surface of the fourth lens, R8 is a radius of curvature of the image-side surface of the fourth lens, f1 is a focal length of the first lens, and f6 is a focal length of the sixth lens.

Next, optical imaging systems according to various examples will be described.

An example of optical imaging system will be described with reference to FIG. 1.

The optical imaging system 100 according to the example may include a first lens 110, a second lens 120, a third lens 130, a fourth lens 140, a fifth lens 150, and a sixth lens 160.

The first lens 110 may have positive refractive power, and an object-side surface thereof may be convex and an image-side surface thereof may be concave. Inflection points may be formed on the image-side surface of the first lens 110. The second lens 120 may have negative refractive power, and an object-side surface thereof may be convex and an image-side surface thereof may be concave. The third lens 130 may have positive refractive power, and an object-side surface thereof may be convex and an image-side surface thereof may be concave. Inflection points may be formed on the image-side surface of the third lens 130. The fourth lens 140 may have negative refractive power, and an object-side surface thereof may be convex and an image-side surface thereof may be concave. The fifth lens 150 may have negative refractive power, and an object-side surface thereof may be convex and an image-side surface thereof may be concave. Inflection points may be formed on both surfaces of the fifth lens 150. The sixth lens 160 may have positive refractive power, and an object-side surface thereof may be convex and an image-side surface thereof may be concave. Inflection points may be formed on both surfaces of the sixth lens 160.

The optical imaging system 100 may further include a filter 170, an image sensor 180, and a stop ST. The filter 170 may be disposed between the sixth lens 160 and the image sensor 180, and the stop ST may be disposed between the first lens 110 and the second lens 120.

Figure 2:
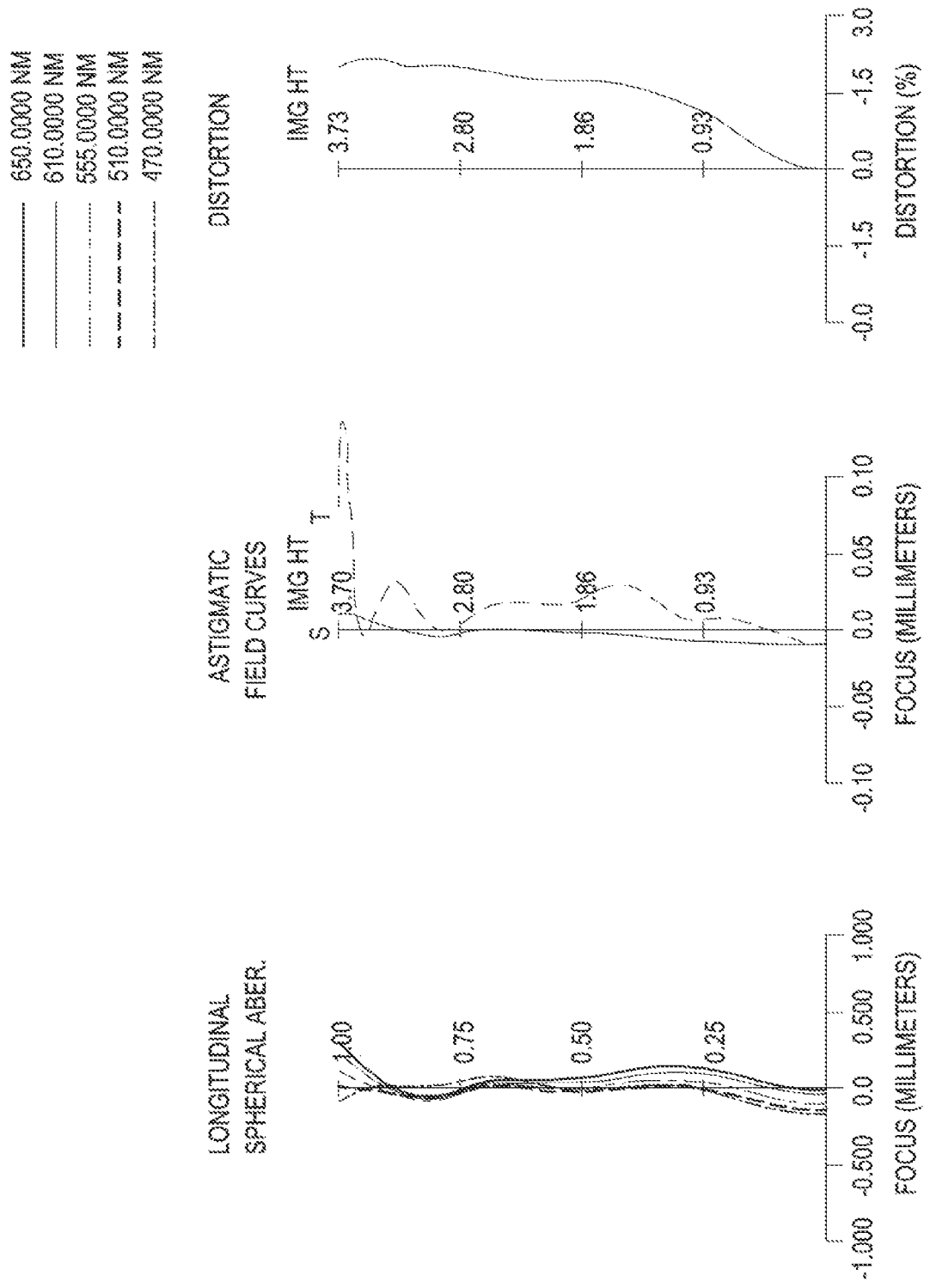
FIG. 2 illustrates graphs representing aberration curves of the optical imaging system illustrated in FIG. 1.

The optical imaging system configured as described above may represent aberration characteristics as illustrated in FIG. 2. Characteristics of lenses and aspherical values of the optical imaging system according to the examples are represented by Table 1 and Table 2.

TABLE 1

First Example

| f = 4.120 | F No. = 1.99 | FOV = 83.14 | TLL = 4.665 |
| --- | --- | --- | --- |

| Surface No. | | Radius of Curvature | Thickness/ Distance | Refractive Index | Abbe Number | Effective Diameter | Focal Length |
| --- | --- | --- | --- | --- | --- | --- | --- |
| S1 | First Lens | 1.4366 | 0.6149 | 1.546 | 56.11 | 1.06 | 3.299 |
| S2 | | 6.0246 | 0.0637 | | | 1.00 | |
| S3 | Second Lens | 32.9400 | 0.2300 | 1.667 | 20.35 | 0.95 | −10.055 |
| S4 | | 5.5563 | 0.2053 | | | 0.85 | |
| S5 | Third Lens | 6.3389 | 0.3030 | 1.546 | 56.11 | 090 | 25.932 |
| S6 | | 11.4580 | 0.3174 | | | 0.97 | |
| S7 | Fourth Lens | 188.5888 | 0.2500 | 1.667 | 20.35 | 1.07 | −22.622 |
| S8 | | 13.9623 | 0.3471 | | | 1.37 | |
| S9 | Fifth Lens | 12.9145 | 0.6132 | 1.656 | 21.53 | 1.58 | −16.710 |
| S10 | | 5.8164 | 0.1000 | | | 2.03 | |
| S11 | Sixth Lens | 1.6520 | 0.5937 | 1.536 | 55.65 | 2.61 | 1333.279 |
| S12 | | 1.4482 | 0.1080 | | | 2.80 | |
| S13 | Filter | infinity | 0.1100 | 1.518 | 64.20 | 3.26 | |
| S14 | | infinity | 0.7087 | | | 3.30 | |
| S15 | Imaging Plane | infinity | 0.0100 | | | 3.73 | |

TABLE 2

| First Example | S1 | S2 | S3 | S4 | S5 | S6 | S7 | S8 | S9 | S10 | S11 | S12 |
| --- | --- | --- | --- | --- | --- | --- | --- | --- | --- | --- | --- | --- |
| Radius of Curvature | 1.437 | 6.025 | 32.940 | 5.556 | 6.339 | 11.458 | 188.589 | 13.962 | 12.914 | 5.816 | 1.652 | 1.448 |
| K | −0.328 | 0.979 | −0.947 | 1.000 | −1.000 | 0.000 | 0.953 | 13.443 | 2.121 | −14.908 | −2.928 | −1.005 |
| A | 0.005 | −0.047 | −0.010 | 0.018 | −0.101 | −0.048 | −0.104 | −0.085 | 0.077 | −0.087 | −0.412 | −0.321 |
| B | 0.008 | −0.103 | −0.059 | 0.115 | 0.322 | −0.133 | −0.207 | −0.293 | −0.359 | 0.011 | 0.242 | 0.179 |
| C | 0.039 | 0.420 | 0.488 | −0.330 | −2.074 | 0.589 | 0.588 | 0.796 | 0.431 | 0.019 | −0.077 | −0.076 |
| D | −0.236 | −0.994 | −1.140 | 0.997 | 6.309 | −1.932 | −0.573 | −1.059 | −0.32 | −0.020 | 0.01 | 0.02 |
| E | 0.434 | 1.244 | 1.402 | −1.581 | −10.659 | 3.328 | −0.556 | 0.762 | 0.126 | 0.008 | −0.002 | −0.004 |
| F | −0.377 | −0.780 | −0.793 | 1.199 | 9.231 | −2.982 | 1.608 | −0.276 | −0.021 | −0.002 | 0.000 | 0.000 |
| G | 0.114 | 0.193 | 0.172 | −0.194 | −3.033 | 1.152 | −1.287 | 0.039 | 0.001 | 0.000 | 0.000 | 0.000 |
| H | 0 | 0 | 0 | 0 | 0 | 0.364 | 0 | 0 | 0 | 0 | 0 | 0.000 |

Figure 3:
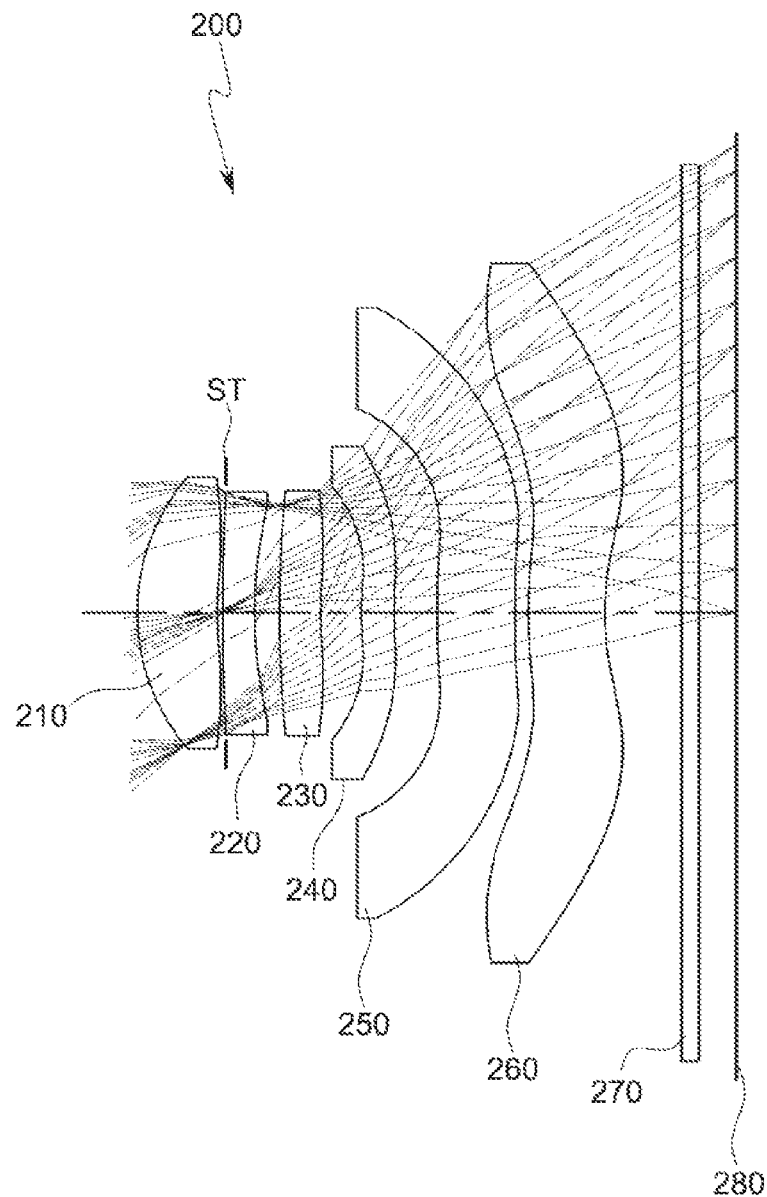
FIG. 3 is a view illustrating a second example of an optical imaging system.

An example of an optical imaging system will be described with reference to FIG. 3.

In a second example, the optical imaging system 200 may include a first lens 210, a second lens 220, a third lens 230, a fourth lens 240, a fifth lens 250, and a sixth lens 260.

The first lens 210 may have positive refractive power, and an object-side surface thereof may be convex and an image-side surface thereof may be concave. Inflection points may be formed on the image-side surface of the first lens 210. The second lens 220 may have negative refractive power, and an object-side surface thereof may be convex and an image-side surface thereof may be concave. The third lens 230 may have positive refractive power, and an object-side surface thereof may be convex and an image-side surface thereof may be concave. Inflection points may be formed on the image-side surface of the third lens 230. The fourth lens 240 may have negative refractive power, and an object-side surface thereof may be concave and an image-side surface thereof may be concave. The fifth lens 250 may have negative refractive power, and an object-side surface thereof may be convex and an image-side surface thereof may be concave. Inflection points may be formed on both surfaces of the fifth lens 250. The sixth lens 260 may have positive refractive power, and an object-side surface thereof may be convex and an image-side surface thereof may be concave. Inflection points may be formed on both surfaces of the sixth lens 260.

The optical imaging system 200 may further include a filter 270, an image sensor 280, and a stop ST. The filter 270 may be disposed between the sixth lens 260 and the image sensor 280, and the stop ST may be disposed between the first lens 210 and the second lens 220.

Figure 4:
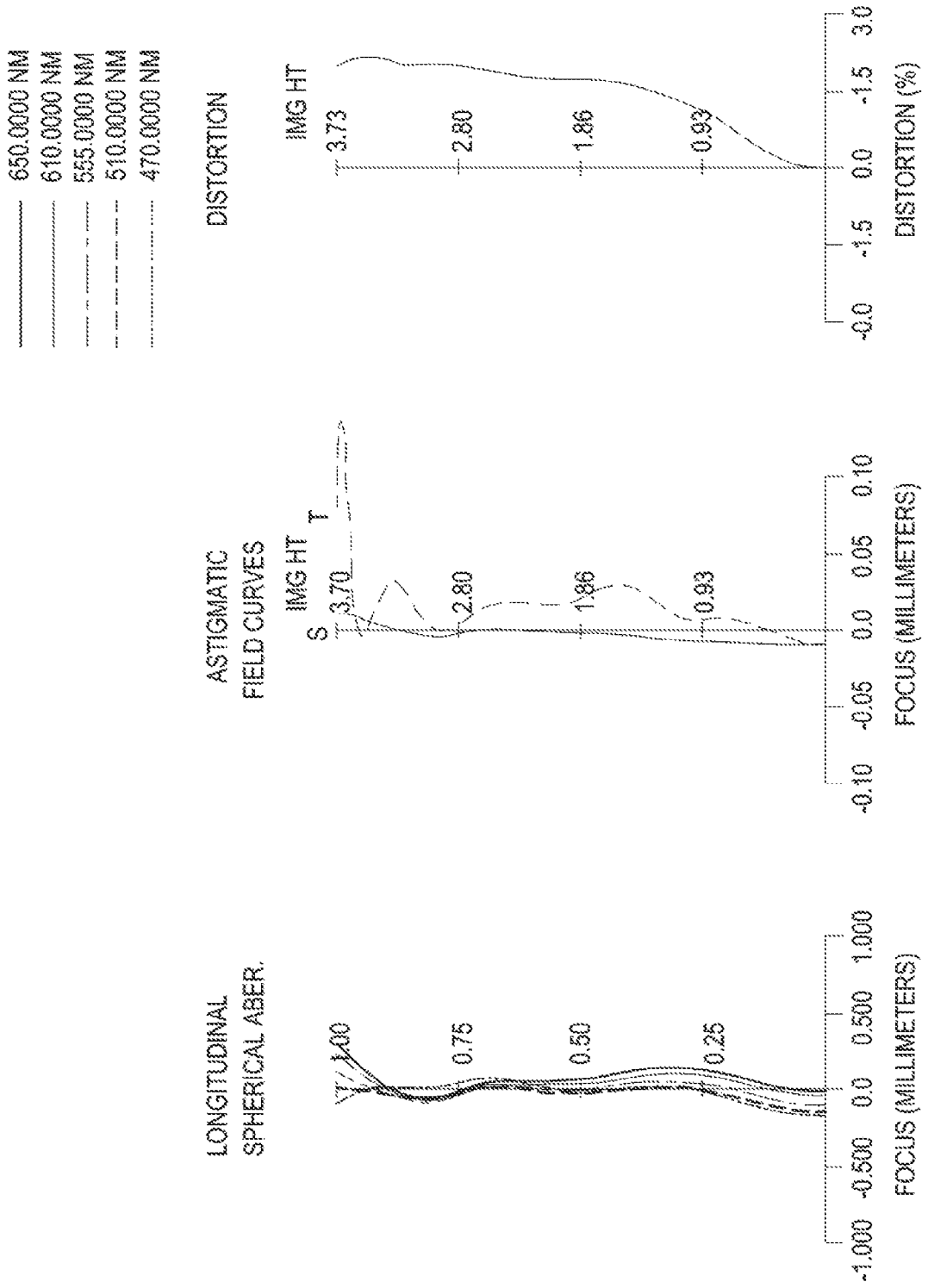
FIG. 4 illustrates graphs representing aberration curves of the optical imaging system illustrated in FIG. 3.

The optical imaging system configured as described above may represent aberration characteristics as illustrated in FIG. 4. Characteristics of lenses and aspherical values of the optical imaging system according to the second example are represented by Table 3 and Table 4.

TABLE 3

Second Example

| | | f = 4.110 | F No. = 1.97 | | FOV = 83.22 | | TLL = 4.665 |
|---|---|---|---|---|---|---|---|
| Surface No. | | Radius of Curvature | Thickness/ Distance | Refractive Index | Abbe Number | Effective Diameter | Focal Length |
| S1 | First Lens | 1.4403 | 0.6343 | 1.546 | 56.11 | 1.06 | 3.302 |
| S2 | | 6.0250 | 0.0519 | | | 1.00 | |
| S3 | Second Lens | 31.3219 | 0.2300 | 1.667 | 20.35 | 0.96 | −10.256 |
| S4 | | 5.6099 | 0.2121 | | | 0.85 | |
| S5 | Third lens | 6.3042 | 0.3033 | 1.546 | 56.11 | 0.88 | 25.234 |
| S6 | | 11.4156 | 0.3198 | | | 0.95 | |
| S7 | Fourth Lens | −100.0127 | 0.2600 | 1.667 | 20.35 | 1.05 | −20.097 |
| S8 | | 15.5410 | 0.3349 | | | 1.34 | |
| S9 | Fifth Lens | 12.3924 | 0.6026 | 1.656 | 21.53 | 1.53 | −15.269 |
| S10 | | 5.4387 | 0.1000 | | | 2.00 | |
| S11 | Sixth Lens | 1.5788 | 0.5863 | 1.536 | 55.65 | 2.60 | 87.816 |
| S12 | | 1.4217 | 0.6206 | | | 2.78 | |
| S13 | Filter | infinity | 0.1100 | 1.518 | 64.20 | 3.50 | |
| S14 | | infinity | 0.2880 | | | 3.54 | |
| S15 | Imaging Plane | infinity | 0.0120 | | | 3.73 | |

TABLE 4

| Second Example | S1 | S2 | S3 | S4 | S5 | S6 | S7 | S8 | S9 | S10 | S11 | S12 |
|---|---|---|---|---|---|---|---|---|---|---|---|---|
| Radius of Curvature | 1.440 | 6.025 | 31.322 | 5.610 | 6.304 | 11.416 | −100.013 | 15.541 | 12.392 | 5.439 | 1.579 | 1.422 |
| K | −0.332 | 0.979 | −0.947 | 1.000 | −1.000 | 0.000 | 0.953 | 13.443 | 2.121 | −14.908 | −2.967 | −1.009 |
| A | −0.002 | −0.051 | −0.006 | 0.018 | −0.095 | −0.052 | −0.110 | −0.086 | 0.084 | −0.101 | −0.429 | −0.332 |
| B | 0.063 | −0.082 | −0.068 | 0.160 | 0.281 | −0.083 | −0.157 | −0.271 | −0.383 | 0.027 | 0.254 | 0.189 |
| C | −0.177 | 0.272 | 0.443 | −0.629 | −1.863 | 0.351 | 0.412 | 0.748 | 0.485 | 0.012 | −0.081 | −0.082 |
| D | 0.233 | −0.546 | −0.890 | 1.928 | 5.673 | −1.336 | −0.139 | −1.007 | −0.38 | −0.019 | 0.02 | 0.02 |
| E | −0.129 | 0.586 | 0.925 | −3.155 | −9.587 | 2.496 | −1.346 | 0.731 | 0.160 | 0.009 | −0.002 | −0.005 |
| F | −0.026 | −0.293 | −0.370 | 2.573 | 8.297 | −2.374 | 2.520 | −0.266 | −0.031 | −0.002 | 0.000 | 0.001 |
| G | 0.026 | 0.048 | 0.027 | −0.690 | −2.718 | 0.970 | −1.865 | 0.038 | 0.002 | 0.000 | 0.000 | 0.000 |
| H | 0 | 0 | 0 | 0 | 0 | 0 | 0.514 | 0 | 0 | 0 | 0 | 0.000 |

Figure 5:
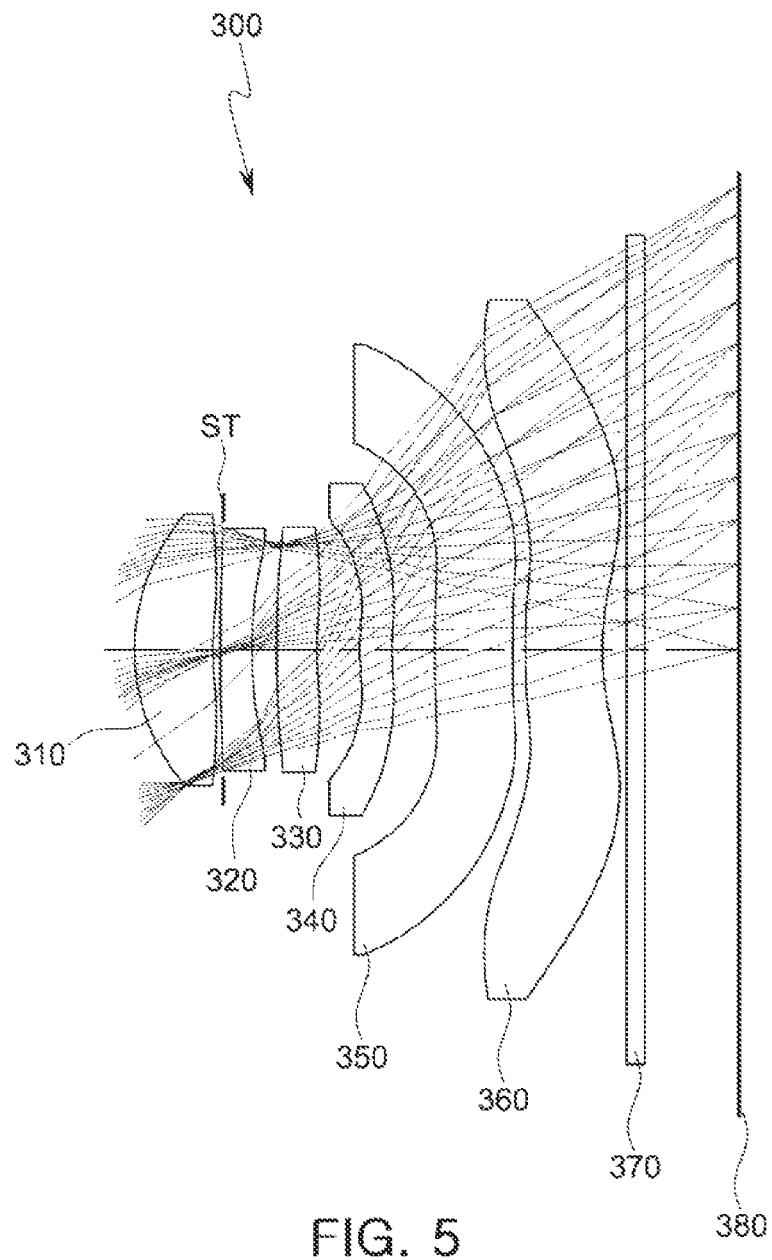
FIG. 5 illustrates a third example of an optical imaging system.

A third example of an optical imaging system will be described with reference to FIG. 5.

In an example, the optical imaging system 300 may include a first lens 310, a second lens 320, a third lens 330, a fourth lens 340, a fifth lens 350, and a sixth lens 360.

In an example, the first lens 310 may have positive refractive power, and an object-side surface thereof may be convex and an image-side surface thereof may be concave. Inflection points may be formed on the image-side surface of the first lens 310. The second lens 320 may have negative refractive power, and an object-side surface thereof may be convex and an image-side surface thereof may be concave. The third lens 330 may have positive refractive power, and an object-side surface thereof may be convex and an image-side surface thereof may be concave. Inflection points may be formed on the image-side surface of the third lens 330. The fourth lens 340 may have negative refractive power, and an object-side surface thereof may be concave and an image-side surface thereof may be concave. The fifth lens 350 may have negative refractive power, and an object-side surface thereof may be convex and an image-side surface thereof may be concave. Inflection points may be formed on both surfaces of the fifth lens 350. The sixth lens 360 may have positive refractive power, and an object-side surface thereof may be convex and an image-side surface thereof may be concave. Inflection points may be formed on both surfaces of the sixth lens 360.

The optical imaging system 300 may further include a filter 370, an image sensor 380, and a stop ST. The filter 370 may be disposed between the sixth lens 360 and the image sensor 380, and the stop ST may be disposed between the first lens 310 and the second lens 320.

Figure 6:
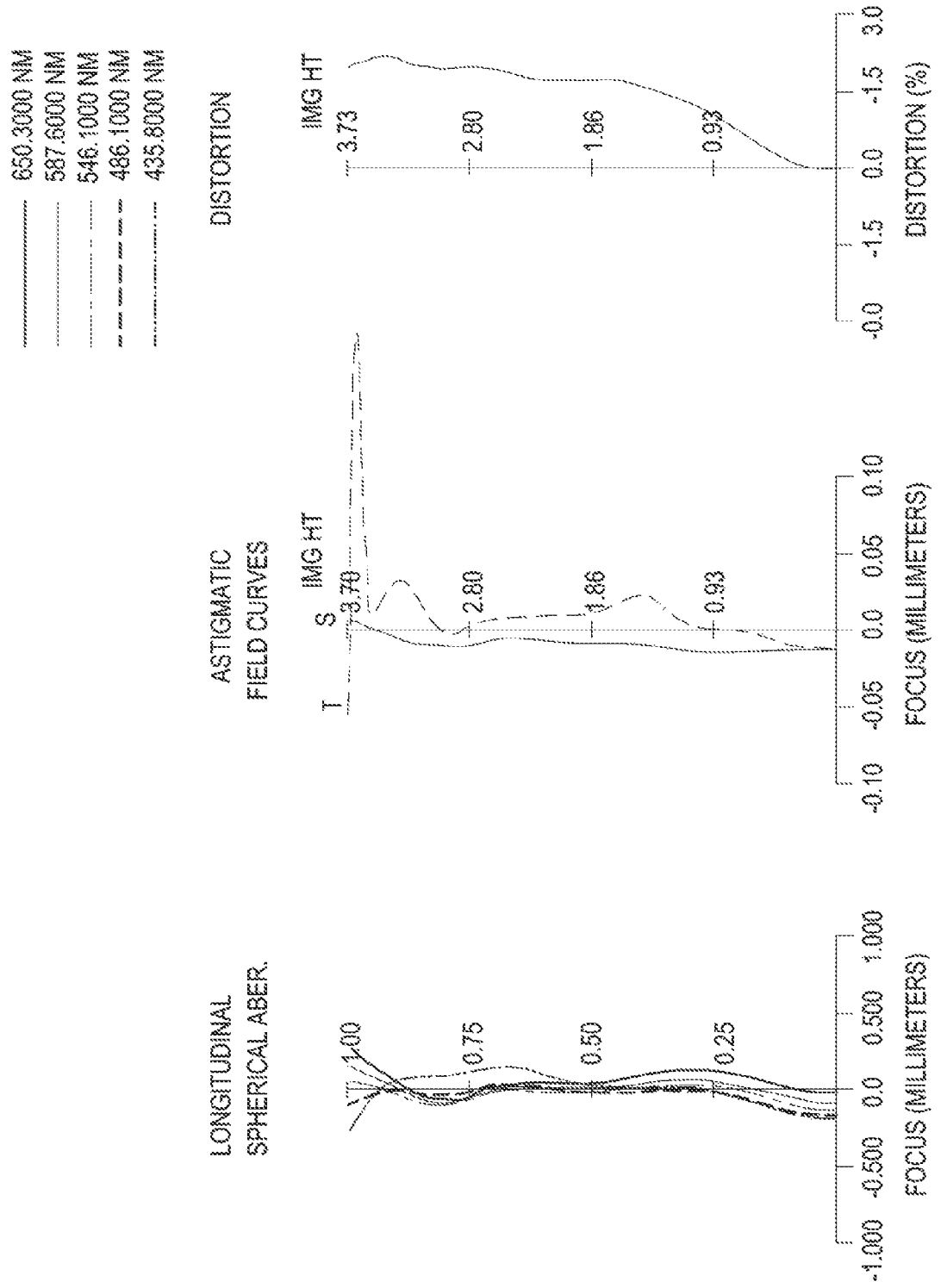
FIG. 6 illustrates graphs representing aberration curves of the optical imaging system illustrated in FIG. 5.

The optical imaging system configured as described above may represent aberration characteristics as illustrated in FIG. 6. Characteristics of lenses and aspherical values of the optical imaging system according to various examples are represented by Table 5 and Table 6.

TABLE 5

| | Third Example | | | |
|---|---|---|---|---|
| f = 4.110 | | F No. = 1.98 | FOV = 83.25 | TLL = 4.665 |
| Surface No. | | Radius of Curvature | Thickness/ Distance | Refractive Index | Abbe Number | Effective Diameter | Focal Length |
| S1 | First Lens | 1.4467 | 0.6342 | 1.545 | 56.11 | 1.06 | 3.291 |
| S2 | | 6.2504 | 0.0520 | | | 1.00 | |
| S3 | Second Lens | 31.5159 | 0.2300 | 1.667 | 20.35 | 0.96 | −10.084 |
| S4 | | 5.5384 | 0.2113 | | | 0.85 | |
| S5 | Third Lens | 6.2696 | 0.2975 | 1.546 | 56.11 | 0.87 | 26.329 |
| S6 | | 10.9247 | 0.3253 | | | 0.95 | |
| S7 | Fourth Lens | −146.5455 | 0.2600 | 1.667 | 20.35 | 1.06 | −20.784 |
| S8 | | 15.3654 | 0.3375 | | | 1.35 | |
| S9 | Fifth Lens | 11.4177 | 0.5972 | 1.656 | 21.53 | 1.58 | −15.860 |
| S10 | | 5.3366 | 0.1000 | | | 2.01 | |
| S11 | Sixth Lens | 1.5986 | 0.5900 | 1.536 | 55.65 | 2.63 | 105.080 |
| S12 | | 1.4332 | 0.1980 | | | 2.80 | |
| S13 | Filter | infinity | 0.1100 | 1.518 | 64.20 | 3.25 | |
| S14 | | infinity | 0.7107 | | | 3.29 | |
| S15 | Imaging Plane | infinity | 0.0120 | | | 3.74 | |

TABLE 6

| Third Example | S1 | S2 | S3 | S4 | S5 | S6 | S7 | S8 | S9 | S10 | S11 | S12 |
|---|---|---|---|---|---|---|---|---|---|---|---|---|
| Radius of Curvature | 1.447 | 6.250 | 31.516 | 6.538 | 6.270 | 10.925 | −146.546 | 15.365 | 11.418 | 6.337 | 1.699 | 1.433 |
| K | −0.334 | 0.979 | −0.947 | 1.000 | −1.000 | 0.000 | 0.953 | 13.443 | 2.121 | −14.908 | −2.897 | −1.007 |
| A | 0.004 | −0.045 | −0.007 | 0.023 | −0.096 | −0.052 | −0.109 | −0.088 | 0.084 | −0.092 | −0.424 | −0.328 |
| B | 0.015 | −0.164 | −0.083 | 0.082 | 0.281 | −0.103 | −0.180 | −0.274 | −0.382 | 0.015 | 0.248 | 0.185 |
| C | 0.001 | 0.640 | 0.558 | −0.117 | −1.902 | 0.455 | 0.490 | 0.749 | 0.478 | 0.019 | −0.077 | −0.080 |
| D | −0.129 | −1.340 | −1.162 | 0.255 | 5.899 | −1.604 | −0.261 | −0.997 | −0.38 | −0.022 | 0.01 | 0.02 |
| E | 0.276 | 1.515 | 1.240 | −0.292 | −10.097 | 2.896 | −1.271 | 0.715 | 0.159 | 0.009 | −0.002 | −0.005 |
| F | −0.260 | −0.869 | −0.565 | 0.078 | 8.803 | −2.703 | 2.562 | −0.258 | −0.032 | −0.002 | 0.000 | 0.001 |
| G | 0.080 | 0.197 | 0.079 | 0.181 | −2.899 | 1.086 | −1.948 | 0.036 | 0.002 | 0.000 | 0.000 | 0.000 |
| H | 0 | 0 | 0 | 0 | 0 | 0 | 0.546 | 0 | 0 | 0 | 0 | 0.000 |

Table 7 represents examples of values of Conditional Expressions of the optical imaging systems.

TABLE 7

| Conditional Expression | First Example | Second Example | Third. Example |
|---|---|---|---|
| F No. | 1.990 | 1.970 | 1.980 |
| FOV | 83.14 | 83.22 | 83.25 |
| TTL/f | 1.132 | 1.135 | 1.135 |
| f1/f | 0.801 | 0.803 | 0.801 |
| D34/D12 | 4.982 | 6.165 | 6.252 |
| D34/D23 | 1.546 | 1.508 | 1.539 |
| D34/D45 | 0.914 | 0.955 | 0.964 |
| |R7/R8| | 13.507 | 6.435 | 9.537 |
| f6/f1 | 404.11 | 26.59 | 31.93 |
| f3/f1 | 7.860 | 7.642 | 8.000 |
| f3/f4 | −1.146 | −1.256 | −1.267 |

As set forth in the examples above, an optical imaging system appropriate for a small camera component having high performance may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure

What is claimed is:

1. An optical imaging system comprising:
 a first lens comprising positive refractive power and a convex object-side surface;
 a second lens comprising negative refractive power and a convex object-side surface;
 a third lens comprising a convex object-side surface and a concave image-side surface;
 a fourth lens comprising negative refractive power, a convex object-side surface, and a concave image-side surface;
 a fifth lens comprising a convex object-side surface; and
 a sixth lens comprising positive refractive power, and a concave image-side surface, wherein the first to sixth lenses are sequentially disposed from an object side.

2. The optical imaging system of claim 1, wherein the second lens has a concave image-side surface.

3. The optical imaging system of claim 1, wherein the fifth lens has a concave image-side surface.

4. The optical imaging system of claim 1, wherein the sixth lens has a convex object-side surface.

5. The optical imaging system of claim 1, wherein the fifth lens has negative refractive power.

6. The optical imaging system of claim 1, wherein TTL/f<1.2 in which TTL is a distance from an object-side surface of the first lens to an imaging plane, and f is an overall focal length of the optical imaging system.

7. The optical imaging system of claim 1, wherein f1/f<1.0 in which f is an overall focal length of the optical imaging system, and f1 is a focal length of the first lens.

8. An optical imaging system comprising:
 a first lens comprising positive refractive power and a convex object-side surface;
 a second lens comprising negative refractive power and a convex object-side surface;
 a third lens comprising a convex object-side surface and a concave image-side surface;
 a fourth lens comprising negative refractive power, a convex object-side surface, and a concave image-side surface;
 a fifth lens comprising a convex object-side surface; and
 a sixth lens comprising a concave image-side surface,
 wherein the first to sixth lenses are sequentially disposed from an object side, and
 wherein an f-number of the optical imaging system is 2.0 or less.

9. The optical imaging system of claim 8, wherein the first lens has a concave image-side surface.

10. The optical imaging system of claim 8, wherein the second lens has a concave image-side surface.

11. The optical imaging system of claim 8, wherein the third lens has positive refractive power.

12. The optical imaging system of claim 8, wherein an inflection point is formed on an image-side surface of the third lens.

13. The optical imaging system of claim 8, wherein the sixth lens has a convex object-side surface.

14. The optical imaging system of claim 8, wherein TTL/f<1.2 in which TTL is a distance from an object-side surface of the first lens to an imaging plane, and f is an overall focal length of the optical imaging system.

15. The optical imaging system of claim 8, wherein f1/f<1.0 in which f is an overall focal length of the optical imaging system, and f1 is a focal length of the first lens.

16. An optical imaging system comprising:
 a first lens comprising positive refractive power and a convex object-side surface;
 a second lens comprising negative refractive power and a convex object-side surface;
 a third lens comprising a convex object-side surface and a concave image-side surface;
 a fourth lens comprising negative refractive power, a convex object-side surface, and a concave image-side surface;
 a fifth lens comprising a convex object-side surface; and
 a sixth lens comprising positive refractive power,
 wherein the first to sixth lenses are sequentially disposed from an object side, and
 wherein a radius of curvature of the object-side surface of the second lens is greater than a radius of curvature of an image-side surface of the first lens.

* * * * *